(12) United States Patent
Yang et al.

(10) Patent No.: US 12,438,373 B2
(45) Date of Patent: Oct. 7, 2025

(54) SYSTEM AND METHOD FOR UNBALANCED CURRENT ADJUSTMENT FROM CAPACITY ENHANCEMENT AND SPLIT-PHASE OUTPUT OF DISTRIBUTION TRANSFORMER

(71) Applicant: ELECTRIC POWER RESEARCH INSTITUTE OF YUNNAN POWER GRID CO., LTD, Kunming (CN)

(72) Inventors: Jindong Yang, Kunming (CN); Hongwen Liu, Kunming (CN); Fei Rong, Kunming (CN)

(73) Assignee: ELECTRIC POWER RESEARCH INSTITUTE OF YUNNAN POWER GRID CO., LTD, Kunming (CN)

( * ) Notice: Subject to any disclaimer, the term of this patent is extended or adjusted under 35 U.S.C. 154(b) by 0 days.

(21) Appl. No.: 18/558,352

(22) PCT Filed: Feb. 14, 2023

(86) PCT No.: PCT/CN2023/075845
§ 371 (c)(1),
(2) Date: Oct. 31, 2023

(87) PCT Pub. No.: WO2024/001202
PCT Pub. Date: Jan. 4, 2024

(65) Prior Publication Data
US 2025/0070685 A1    Feb. 27, 2025

(30) Foreign Application Priority Data
Jun. 27, 2022  (CN) .......................... 202210736250.6

(51) Int. Cl.
*H02J 3/18* (2006.01)
*H02J 3/26* (2006.01)
(Continued)

(52) U.S. Cl.
CPC .............. *H02J 3/26* (2013.01); *H02J 3/1842* (2013.01); *H02J 3/185* (2013.01);
(Continued)

(58) Field of Classification Search
CPC .......... H02J 3/18; H02J 3/1821; H02J 3/1835; H02J 3/1842; H02J 3/185
See application file for complete search history.

(56) References Cited

U.S. PATENT DOCUMENTS

| | | | |
|---|---|---|---|
| 5,670,864 A | * | 9/1997 | Marx ..................... H02J 3/1821 323/210 |
| 5,883,796 A | | 3/1999 | Cheng et al. |

(Continued)

FOREIGN PATENT DOCUMENTS

| | | |
|---|---|---|
| CN | 106972505 A | 7/2017 |
| CN | 216672609 U | 6/2022 |
| CN | 115036945 A | 9/2022 |

OTHER PUBLICATIONS

Gang Jia et al., "Three Phase Load Imbalance in Low Voltage Distribution Network", Rural Electrification, 2019, vol. 12, p. 65-66.

*Primary Examiner* — Gary L Laxton
(74) *Attorney, Agent, or Firm* — IDEA Intellectual Limited; Sam T. Yip

(57) ABSTRACT

The system and method for unbalanced current adjustment from capacity increase and phase-splitting output of distribution transformer according to embodiments of the present invention are provided, in which the system for unbalanced current adjustment from capacity increase and phase-splitting output of distribution transformer includes a single-phase transformer, a single-phase bridge rectifier, and a three-phase full-bridge inverter. The high-voltage side of the single-phase transformer is connected to the high-voltage side of the distribution transformer. The single-phase bridge rectifier connected to the low-voltage side of the single-phase transformer converts the AC power from the single-phase transformer into the DC power for the three-phase full-bridge inverter. The three-phase full-bridge inverter is connected to the three-phase lines through the three-phase reactors. It processes the three-phase load current through the sequence component decomposition to obtain the three-phase negative sequence current and the three-phase zero sequence current. This is then combined with the capacitor (Continued)

voltage control component to calculate and then obtain the three-phase reference current. Then, the three-phase reference current undergoes the hysteresis controlling, which allows the three-phase full-bridge inverter to output the corresponding three-phase compensation currents to the three-phase lines, achieving the three-phase current imbalance adjustment.

10 Claims, 6 Drawing Sheets

(51) Int. Cl.
*H02M 7/5387* (2007.01)
*H02M 5/458* (2006.01)

(52) U.S. Cl.
CPC ........ *H02M 7/53871* (2013.01); *H02M 5/458* (2013.01); *H02M 5/4585* (2013.01)

(56) References Cited

U.S. PATENT DOCUMENTS

| | | | | |
|---|---|---|---|---|
| 2005/0071050 A1* | 3/2005 | Chow | ................... | H02J 3/1814 |
| | | | | 700/286 |
| 2011/0088748 A1* | 4/2011 | Lee | ....................... | H02M 5/293 |
| | | | | 136/244 |
| 2011/0148202 A1* | 6/2011 | Rada | ........................ | G05F 1/70 |
| | | | | 307/105 |

* cited by examiner

SYSTEM AND METHOD FOR UNBALANCED CURRENT ADJUSTMENT FROM CAPACITY ENHANCEMENT AND SPLIT-PHASE OUTPUT OF DISTRIBUTION TRANSFORMER

TECHNICAL FIELD

The invention relates to a technical field of electric power systems, and in particular to a system and method for unbalanced current adjustment from capacity enhancement and split-phase output of a distribution transformer.

BACKGROUND

With the advancement of new power system construction, a large number of single-phase distributed energy sources are connected to the transformer area. Due to the randomness, intermittency of the distributed energy sources and the household single-phase loads, as well as various user consumption patterns, the intermittent on-off cycles of the distributed energy sources and the single-phase loads make it difficult to achieve balanced distribution of A, B, and C-phase currents in the distribution transformers. This results in overloading of certain phases, significantly affecting the service lifetime of the distribution transformers, and even causing them to burn out.

In relevant technologies, there is an approach that adjusts load-side currents by controlling the phase-shifting switches through a main controller to achieve optimal three-phase distribution of the user loads. However, this approach fails to achieve continuously adjustment and cannot fully realize balanced three-phase currents. Therefore, how to achieve three-phase current balance in the distribution transformers completely has become a technical issue that needs to be addressed by experts in this field.

SUMMARY OF INVENTION

In view of this, the present invention provides a system and method for unbalanced current adjustment from capacity enhancement and split-phase output of a distribution transformer, so as to solve the problems of insufficient capacity of the distribution transformer and the unbalanced three-phase current in the prior art. In addition, the access of single-phase transformers can also increase the capacity of the distribution transformers.

In order to achieve one, part or all of the above objects, or other objects, the first aspect of the present invention provides a power distribution system for application. The power distribution system includes a distribution transformer and an a-phase line, a b-phase line, a c-phase line, and a neutral line n connected to the low voltage side of the distribution transformer.

The system and method for unbalanced current adjustment from capacity enhancement and split-phase output of a distribution transformer provided by embodiments of the present invention include:

a single-phase transformer, wherein the input end of the single-phase transformer is connected to any two phases of the three-phase lines on the high-voltage side of the distribution transformer; the single-phase transformer is configured to change the high voltage of the distribution transformer into the low voltage; the single-phase transformer is further configured to increase the capacity of the transformer area; the increased capacity of the transformer area is the capacity of the single-phase transformer; the capacity of the single-phase transformer is determined by the load size of the distribution transformer;

a single-phase bridge rectifier including a rectifier input end, a DC positive output terminal and a DC negative output terminal; wherein the rectifier input end is connected to the output terminal of the single-phase transformer; the single-phase bridge rectifier is configured to convert the alternating current at the low-voltage side of the single-phase transformer into direct current, which also can invert the direct current into alternating current and transmit it to the power grid;

a three-phase full-bridge inverter including a positive inverter input terminal, a negative inverter input terminal, and an inverter output terminal; wherein the positive inverter input terminal is connected to the DC positive output terminal, and the negative inverter input terminal is connected to the DC negative output terminal; the inverter output terminal is connected to the a-phase line, the b-phase line, and the c-phase line respectively through a three-phase reactor, the three-phase full-bridge inverter is configured to output corresponding compensation currents respectively to the a-phase line, the b-phase line, and the c-phase line through the three-phase reactor, so as to perform three-phase unbalanced current adjustment;

a first filter capacitor connected to the positive inverter input terminal and the DC positive output terminal;

a second filter capacitor connected in series with the first filter capacitor, wherein the second filter capacitor is connected to the negative inverter input terminal and the DC negative output terminal, and the neutral line n is connected between the first filter capacitor and the second filter capacitor.

In a second aspect, embodiments of the present invention further provide a method for unbalanced current adjustment from capacity enhancement and split-phase output of a distribution transformer, which can be applied to the system for the unbalanced current adjustment from the capacity enhancement and the split-phase output of the distribution transformer of the embodiments of the first aspect as aforedescribed above. The method for the unbalanced current adjustment from the capacity enhancement and the split-phase output of the distribution transformer includes:

obtaining the initial unbalance degree according to an a-phase load current of the a-phase line, a b-phase load current of the b-phase line, and a c-phase load current of the c-phase line;

when the initial unbalance is greater than a preset starting value, performing a sequence component decomposition processing on the a-phase load current, the b-phase load current, and the c-phase load current to obtain correspondingly an a-phase negative sequence load current, a b-phase negative sequence current, and a c-phase negative sequence current, as well as an a-phase zero-sequence current, a b-phase zero-sequence current, and a c-phase zero-sequence current;

performing calculating to obtain an a-phase capacitor voltage control component, a b-phase capacitor voltage control component, and a c-phase capacitor voltage according to the voltage between the positive and negative terminals at the first filter capacitor and the second filter capacitor which are connected in series and a preset reference voltage;

obtaining an a-phase compensation current reference value according to the a-phase negative sequence current, the a-phase zero sequence current, and the a-phase capacitor voltage control component; obtaining a b-phase compensation current reference value according to the b-phase negative sequence current, the b-phase zero sequence current, and the b-phase capacitor voltage control component; obtaining a c-phase compensation current reference value according to the c-phase negative sequence current, the c-phase zero sequence current, and the c-phase capacitor voltage control component;

outputting correspondingly the a-phase compensation current, the b-phase compensation current, and the c-phase compensation current to the a-phase line, the b-phase line, and the c-phase line, respectively, and, through hysteresis controlling, making the output a-phase compensation current, the output b-phase compensation current, and the output c-phase compensation current track the a-phase compensation current reference value, the b-phase compensation current reference value, and the c-phase compensation current, respectively, so as to adjust unbalanced current by phase.

Preferably, the method for the unbalanced current adjustment from the capacity enhancement and the split-phase output of the distribution transformer of embodiments of the present invention further includes: obtaining the present unbalance degree, which is determined by the present a-phase load current, the present b-phase load current, and the present c-phase load current;

obtaining the change amplitude of the unbalance degree according to the initial unbalance degree and the present unbalance degree;

when the change amplitude of the unbalance degree reaches a preset offset value, performing three-phase unbalanced current adjustment, according to the present a-phase load current, the present b-phase load current, the present c-phase load current, the present a-phase capacitor voltage control component, the present b-phase capacitor voltage control component, and the present c-phase capacitor voltage control component.

Preferably, the performing calculating to obtain the a-phase capacitor voltage control component, the b-phase capacitor voltage control component, and the c-phase capacitor voltage according to the voltage between the positive and negative terminals at the first filter capacitor and the second filter capacitor which are connected in series and the preset reference voltage including:

obtaining a filtered voltage, which is configured to characterize the voltage between the positive terminal and the negative terminal at the first filter capacitor and the second filter capacitor connected in series;

calculating a difference between the filtered voltage and a preset voltage reference value to obtain a capacitor voltage difference;

obtaining a D-axis active component required for a phase coordinate transformation processing according to the capacitor voltage difference;

performing a phase coordinate transformation processing according to the D-axis active component and a preset Q-axis reactive component to obtain the a-phase capacitor voltage control component, the b-phase capacitor voltage control component, and the c-phase capacitor voltage control component, wherein the Q axis reactive component is preset to be zero.

Preferably, the system for the unbalanced current adjustment from the capacity enhancement and the split-phase output of the distribution transformer further includes a PI controller, wherein the obtaining the D-axis active component required for the phase coordinate transformation processing according to the capacitor voltage difference includes:

inputting the capacitor voltage difference into the PI controller to obtain the D-axis active component required for the phase coordinate transformation processing.

Preferably, the obtaining the a-phase compensation current reference value according to the a-phase negative sequence current, the a-phase zero sequence current, and the a-phase capacitor voltage control component, the obtaining the b-phase compensation current reference value according to the b-phase negative sequence current, the b-phase zero sequence current, and the b-phase capacitor voltage control component, and the obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$
$$I_{b\_ref} = I_b^- + I_b^0 + I_b^*$$
$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value; $I_a^-$ represents the a-phase negative-sequence current, $I_b^-$ represents the b-phase negative sequence current, $I_c^-$ represents the c-phase negative sequence current; $I_a^*$ represents the a-phase capacitor voltage control component, $I_b^*$ represents the b-phase capacitor voltage control component, $I_c^*$ represents the c-phase capacitor voltage control component.

Preferably, the system for the unbalanced current adjustment from the capacity enhancement and the split-phase output of the distribution transformer further includes a hysteresis controller, and the inverter output terminal includes an inverter a-phase output terminal, an inverter b-phase output terminal, and an inverter c-phase output terminal;

the method further includes:
finding the difference between the a-phase compensation current reference value and the a-phase compensation current to obtain the a-phase compensation current difference, finding the difference between the b-phase compensation current reference value and the b-phase compensation current to obtain the b-phase compensation current difference, and finding the difference between the c-phase compensation current reference value and the c-phase compensation current to obtain the c-phase compensation current difference;

inputting the a-phase compensation current difference, the b-phase compensation current difference, and the c-phase compensation current difference into the hysteresis controller to obtain a switching signal of the three-phase full-bridge inverter;

controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance management.

Preferably, the method for the unbalanced current adjustment from the capacity enhancement and the split-phase output of the distribution transformer of embodiments of the present invention further includes when the three-phase load of the distribution transformer is balanced, controlling the three-phase full-bridge inverter to output the same current to the a-phase line, the b-phase line, and the c-phase line, respectively, so as to provide electric energy for the load at the low-voltage side of the distribution transformer.

In a third aspect, embodiments of the present invention further provide a computer device, including:
at least one memory;
at least one processor;
at least one computer program;
wherein the computer program is stored in the memory, and the processor executes the at least one computer program to achieve:
the method described in the embodiments of the second aspect as described above.

In a fourth aspect, embodiments of the present invention further provide a computer-readable storage medium that stores computer-executable instructions, and the computer-executable instructions are configured to make the computer execute:
the method described in the embodiments of the second aspect as described above.

Implementing the embodiment of the present invention have the following beneficial effects:

The system for the unbalanced current adjustment from the capacity increase and the phase-splitting output of the distribution transformer according to embodiments of the present invention is provided, including the single-phase transformer, the single-phase bridge rectifier, and the three-phase full-bridge inverter. The high-voltage side of the single-phase transformer is connected to the high-voltage side of the distribution transformer. The single-phase bridge rectifier connected to the low-voltage side of the single-phase transformer converts the AC power from the single-phase transformer into the DC power for the three-phase full-bridge inverter. The three-phase full-bridge inverter is connected to the three-phase lines through the three-phase reactors. It processes the three-phase load current through the sequence component decomposition to obtain the three-phase negative sequence current and the three-phase zero sequence current. This is then combined with the capacitor voltage control component to calculate and then obtain the three-phase reference current. Then, the three-phase reference current undergoes the hysteresis controlling, which allows the three-phase full-bridge inverter to output the corresponding three-phase compensation currents to the three-phase lines, achieving the three-phase current imbalance adjustment. This effectively suppresses the negative sequence currents generated by the system and the zero sequence currents on the neutral line, addressing three-phase imbalance issues and significantly reducing transmission line losses and improving the quality of the system's electrical energy. Moreover, since the single-phase bridge rectifier independently acquires power from the high-voltage side of the distribution transformer through the single-phase transformer, when the three-phase load of the distribution transformer is balanced, the three-phase full-bridge inverter can also serve as a power source for power supplying for the load at the low-voltage side of the distribution transformer, maximizing equipment capacity utilization and enhancing the system's cost-effectiveness.

Other features and advantages of the present invention will be elucidated in the subsequent description, and some will become apparent from the description or understood through the implementation of the present invention. The objectives and further advantages of the present invention can be achieved and obtained through the structures specifically indicated in the specification, claims, and drawings.

BRIEF DESCRIPTION OF DRAWINGS

In order to provide a clearer explanation of the technical solutions in embodiments of the present invention or the prior art, a brief introduction to the drawings required in the description of embodiments or the prior art will be provided below. Clearly, the drawings described below are only for some embodiments of the present invention. Those skilled in the art will understand that additional drawings can be obtained based on these drawings without creative effort.

Among the drawings.

DETAILED DESCRIPTION OF THE INVENTION

The following will clearly and completely describe the technical solutions in the embodiments of the present invention with reference to the accompanying drawings in the embodiments of the present invention. Obviously, the described embodiments are only some embodiments of the present invention but not all. Based on the embodiments of the present invention, all other embodiments obtained by persons of ordinary skill in the art without creative efforts fall within the protection scope of the present invention.

A system for unbalanced current adjustment from capacity increase and phase-splitting output of a distribution transformer according to embodiments of the present invention is provided, including a single-phase transformer, a single-phase bridge rectifier, and a three-phase full-bridge inverter. The high-voltage side of the single-phase transformer is connected to the high-voltage side of the distribution transformer. The single-phase bridge rectifier connected to the low-voltage side of the single-phase transformer converts the AC power from the single-phase transformer into the DC power for the three-phase full-bridge inverter. The three-phase full-bridge inverter is connected to the three-phase lines through the three-phase reactors. It processes the three-phase load current through the sequence component decomposition to obtain the three-phase negative sequence current and the three-phase zero sequence current. This is then combined with the capacitor voltage control component to calculate and then obtain the three-phase reference current. Then, the three-phase reference current undergoes the hysteresis controlling, which allows the three-phase full-bridge inverter to output the corresponding three-phase compensation currents to the three-phase lines, achieving the three-phase current imbalance adjustment. This effectively suppresses the negative sequence currents generated by the system and the zero sequence currents on the neutral line, addressing three-phase imbalance issues and significantly reducing transmission line losses and improving the quality of the system's electrical energy. Moreover, since the single-phase bridge rectifier independently acquires power from the high-voltage side of the distribution transformer through the single-phase transformer, when the three-phase load of the distribution transformer is balanced, the three-phase full-bridge inverter can also serve as a power source for the load at low-voltage side of the distribution transformer, maximizing equipment capacity utilization and enhancing the system's cost-effectiveness.

For ease of understanding, embodiments of the present invention will be described in detail below in combination with the accompanying drawings.

Figure 1:
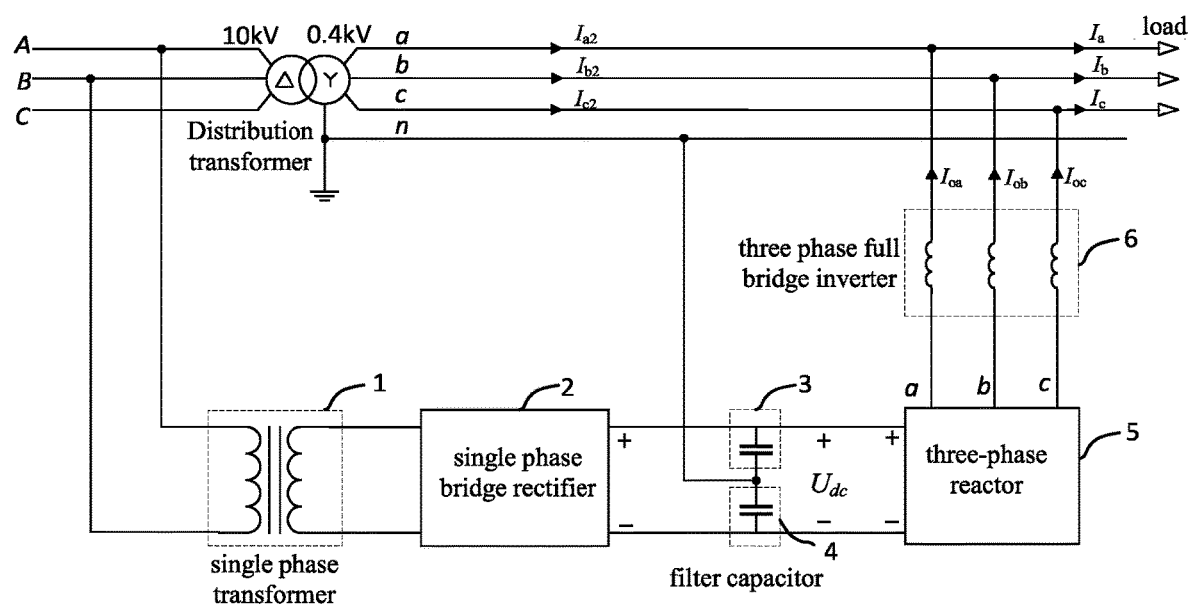
FIG. 1 is a schematic circuit structure diagram of a system for unbalanced current adjustment from capacity increase and phase-splitting output of a distribution transformer according to an embodiment.

Referring is made to FIG. 1, in which FIG. 1 is a schematic circuit structure diagram of a system for unbalanced current adjustment from capacity increase and phase-splitting output of a distribution transformer according to embodiments of the present invention. Specifically, a system for unbalanced current adjustment from capacity enhancement and split-phase output of a distribution transformer is applied to a power distribution system. The power distribution system includes a distribution transformer and an a-phase line, a b-phase line, a c-phase line, and a neutral line n connected to a low voltage side of the distribution transformer, namely, a load side of the distribution transformer.

Specifically, the system for the unbalanced current adjustment from the capacity enhancement and the split-phase output of the distribution transformer includes a single-phase transformer 1, a single-phase bridge rectifier 2, a three-phase full-bridge inverter 5, a three-phase reactor 6, a first filter capacitor 3, and a second filter capacitor 4;

specifically, the input end of the single-phase transformer 1 is connected to any two phases of the three-phase lines on the high-voltage side of the distribution transformer; the single-phase transformer 1 is configured to change the high voltage of the distribution transformer into the low voltage; the single-phase transformer 1 is further configured to increase the capacity of the transformer area corresponding to the distribution transformer, in which the increased capacity of the transformer area is the capacity of the single-phase transformer 1; the capacity of the single-phase transformer 1 is determined by the load size of the distribution transformer;

specifically, the single-phase bridge rectifier 2 includes a rectifier input end, a DC positive output terminal and a DC negative output terminal, wherein the rectifier input end is connected to the output terminal of the single-phase transformer 1; the single-phase bridge rectifier 2 is configured to convert the alternating current at the low-voltage side of the single-phase transformer 1 into direct current, which also can invert the direct current into alternating current and transmit it to the power grid, namely, which is sent to the high-voltage side of the distribution transformer;

specifically, the three-phase full-bridge inverter 5 includes a positive inverter input terminal, a negative inverter input terminal, and an inverter output terminal, wherein the positive inverter input terminal is connected to the DC positive output terminal, and the negative inverter input terminal is connected to the DC negative output terminal; wherein the inverter output terminal is connected to the a-phase line, the b-phase line, and the c-phase line respectively through a three-phase reactor 6; the three-phase full-bridge inverter 5 is configured to output corresponding compensation currents respectively to the a-phase line, the b-phase line, and the c-phase line through the three-phase reactor 6, so as to perform three-phase unbalanced current adjustment;

a first filter capacitor 3 is connected to the positive inverter input terminal and the DC positive output terminal;

a second filter capacitor 4 is connected in series with the first filter capacitor 3, wherein the second filter capacitor 4 is connected to the negative inverter input terminal and the DC negative output terminal, and the neutral line n is connected between the first filter capacitor 3 and the second filter capacitor 4.

The single-phase transformer 1 is capable of drawing power from the high-voltage side of the distribution transformer, enabling the single-phase bridge uncontrolled rectifier connected to single-phase transformer 1 to convert the AC power from the single-phase transformer 1 into DC power for supplying to the three-phase full-bridge inverter 5. The three-phase full-bridge inverter 5 is connected to the three-phase lines through the three-phase reactors 6. When the unbalance degree in the three-phase lines is greater than a preset starting value, it performs a sequence component decomposition processing on the three-phase load current to obtain three-phase negative sequence current and three-phase zero sequence current. Based on the three-phase negative sequence current, the three-phase zero sequence current, and the capacitive voltage control component, the three-phase reference current is calculated. It then undergoes hysteresis controlling, causing the three-phase full-bridge inverter 5 to output corresponding three-phase compensation currents to the three-phase lines, achieving unbalanced adjustment of the three-phase currents. This precise control effectively suppresses the generation of the negative sequence currents and the zero sequence currents on the neutral line, resolving the three-phase imbalance issue and significantly reducing transmission line losses, thereby enhancing the quality of system power. Moreover, since the single-phase bridge rectifier 2 individually draws power from the high-voltage side of the distribution transformer through the single-phase transformer 1, when the three-phase loads of the distribution transformer are balanced, the three-phase full-bridge inverter 5 can also serve as a power source to supply power for the low-voltage side of the distribution transformer. This maximizes equipment capacity utilization and improves the system's economic efficiency.

In one embodiment, when the load current of each phase of the three-phase line is balanced, the power output by the three-phase full-bridge inverter 5 to each phase of the three-phase line is equal to each other.

It should be noted that, in embodiments of the present invention, the capacitance values of the first filter capacitor 3 and the second filter capacitor 4 are selected according to the actual situation, and the inductance value of the three-phase reactor 6 is selected according to the actual situation. Regarding this, there is no specific restriction in the present application.

The system for the unbalanced current adjustment from the capacity enhancement and the split-phase output of the distribution transformer and the applied scenarios described in embodiments of the present invention are to illustrate the technical solutions of embodiments of the present invention more clearly, and do not constitute the technical solutions provided for embodiments of the present invention. Those skilled in the art know that with the evolution of the power distribution system and the emergence of new applied scenarios, the technical solutions provided by embodiments of the present invention are also applicable to similar technical problems.

Those skilled in the art can understand that the system for the unbalanced current adjustment from the capacity enhancement and the split-phase output of the distribution transformer shown in FIG. 1 does not constitute a limitation to embodiments of the present invention, and it may include more or less components, or combinations of certain components, or different arrangements of components, with respect to the illustration.

Figure 2:
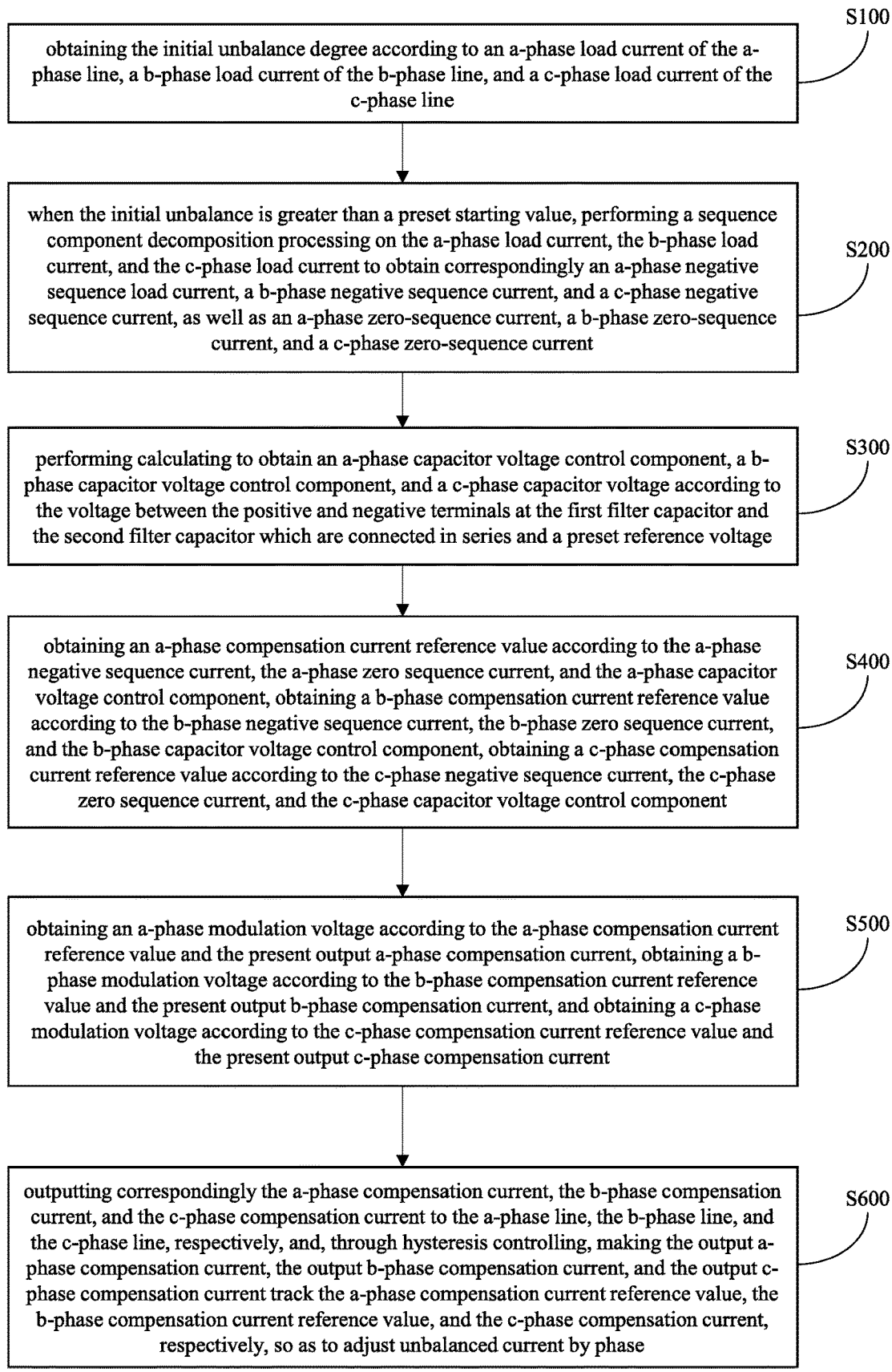
FIG. 2 is a flow chart of a method for unbalanced current adjustment from capacity increase and phase-splitting output of a distribution transformer according to an embodiment.

Referring is made to FIG. 2. Embodiments of the present invention provide a method for unbalanced current adjustment from capacity enhancement and split-phase output of a distribution transformer. The method for the unbalanced current adjustment from the capacity enhancement and the split-phase output of the distribution transformer includes, but is not limited, steps S100 to S600. The following detailed descriptions are made with respect to the method for the unbalanced current adjustment from the capacity enhancement and the split-phase output of the distribution transformer, combined with FIG. 1.

The step S100, obtaining the initial unbalance degree according to an a-phase load current of the a-phase line, a b-phase load current of the b-phase line, and a c-phase load current of the c-phase line;

the step S200, when the initial unbalance is greater than a preset starting value, performing a sequence component decomposition processing on the a-phase load current, the b-phase load current, and the c-phase load current to obtain correspondingly an a-phase negative sequence load current, a b-phase negative sequence current, and a c-phase negative sequence current, as well as an a-phase zero-sequence current, a b-phase zero-sequence current, and a c-phase zero-sequence current;

the step S300, performing calculating to obtain an a-phase capacitor voltage control component, a b-phase capacitor voltage control component, and a c-phase capacitor voltage according to the voltage between the positive and negative terminals at the first filter capacitor and the second filter capacitor which are connected in series and a preset reference voltage;

the step S400, obtaining an a-phase compensation current reference value according to the a-phase negative sequence current, the a-phase zero sequence current, and the a-phase capacitor voltage control component, obtaining a b-phase compensation current reference value according to the b-phase negative sequence current, the b-phase zero sequence current, and the b-phase capacitor voltage control component, obtaining a c-phase compensation current reference value according to the c-phase negative sequence current, the c-phase zero sequence current, and the c-phase capacitor voltage control component;

the step S500, obtaining an a-phase modulation voltage according to the a-phase compensation current reference value and the present output a-phase compensation current, obtaining a b-phase modulation voltage according to the b-phase compensation current reference value and the present output b-phase compensation current, and obtaining a c-phase modulation voltage according to the c-phase compensation current reference value and the present output c-phase compensation current.

the step S600, outputting correspondingly the a-phase compensation current, the b-phase compensation current, and the c-phase compensation current to the a-phase line, the b-phase line, and the c-phase line, respectively, and, through hysteresis controlling, making the output a-phase compensation current, the output b-phase compensation current, and the output c-phase compensation current track the a-phase compensation current reference value, the b-phase compensation current reference value, and the c-phase compensation current, respectively, so as to adjust unbalanced current by phase.

Specifically, in the present embodiments, when the initial unbalance degree is greater than the preset starting value, it indicates that the three-phase load of the distribution transformer is unbalanced. In this scenario, the three-phase load current is subjected to current sequence component decomposition. This calculation can produce the three-phase negative sequence current and the three-phase zero sequence current at the low-voltage side of the distribution transformer, namely, which is also at the load side. These values determine the components of the three-phase negative sequence current and the three-phase zero sequence current requiring unbalanced compensation. Subsequently, according to the negative sequence current, the zero sequence current, and the capacitive voltage control component, the reference value for the three-phase compensating current is computed. By making the three-phase current output from the three-phase full-bridge inverter to the three-phase line at the low-voltage side of the distribution transformer track the three-phase compensation current reference value, the three-phase balance of the current is achieved.

Figure 3:
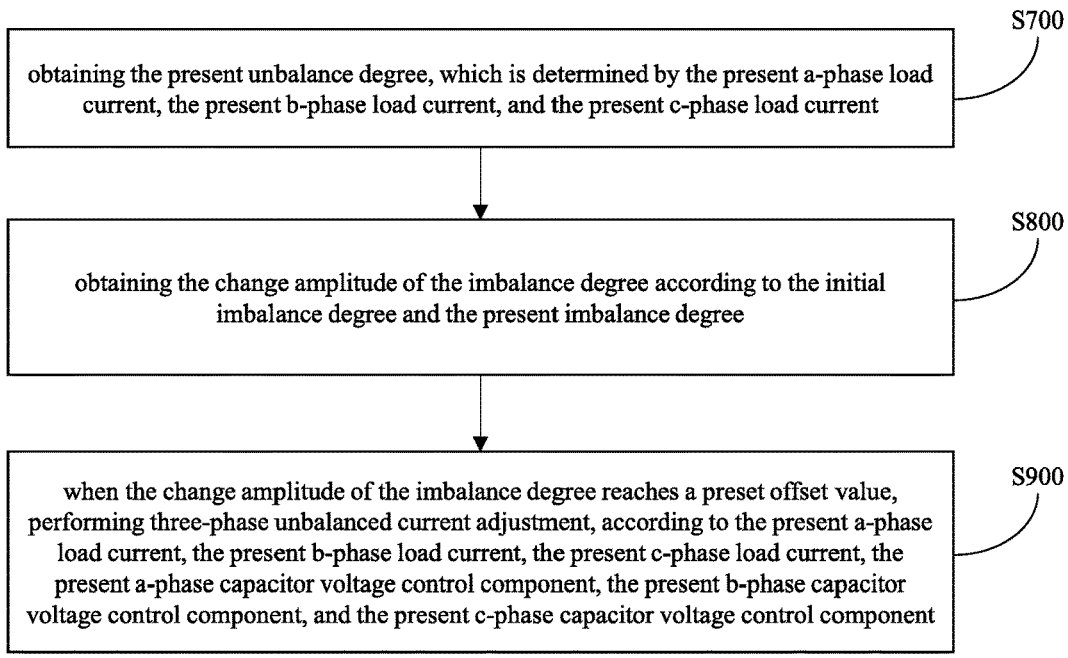
FIG. 3 is a flow chart of a method for unbalanced current adjustment from capacity increase and phase-splitting output of a distribution transformer according to another embodiment.

Referring is made to FIG. 3, the method for the unbalanced current adjustment from the capacity enhancement and the split-phase output of the distribution transformer of embodiments of the present invention further includes steps S700 to S900:

the step S700, obtaining the present unbalance degree, which is determined by the present a-phase load current, the present b-phase load current, and the present c-phase load current;

the step S800, obtaining the change amplitude of the unbalance degree according to the initial unbalance degree and the present unbalance degree;

the step S900, when the change amplitude of the unbalance degree reaches a preset offset value, performing three-phase unbalanced current adjustment, according to the present a-phase load current, the present b-phase load current, the present c-phase load current, the present a-phase capacitor voltage control component, the present b-phase capacitor voltage control component, and the present c-phase capacitor voltage control component.

By detecting the present imbalance multiple times during the adjustment process, the compensation current reference value can be iterated to adapt to the present imbalance, thereby making the adjustment process more accurate.

Figure 4:
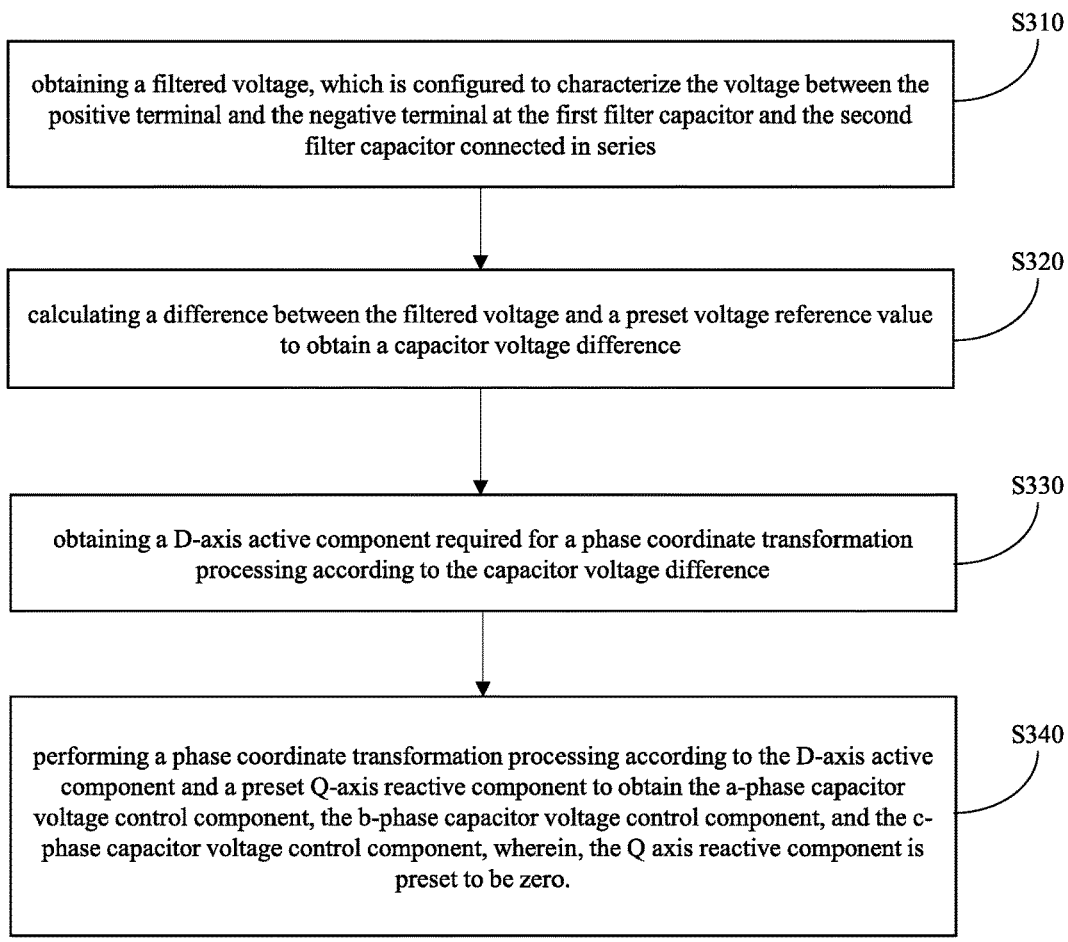
FIG. 4 is a flow chart of a method for unbalanced current adjustment from capacity increase and phase-splitting output of a distribution transformer according to another embodiment.

Referring is made to FIG. 4. The step S300 further includes, but is not limited, steps S310 to S340:

the step S310, obtaining a filtered voltage, which is configured to characterize the voltage between the positive terminal and the negative terminal at the first filter capacitor and the second filter capacitor connected in series;

the step S320, calculating a difference between the filtered voltage and a preset voltage reference value to obtain a capacitor voltage difference;

the step S330, obtaining a D-axis active component required for a phase coordinate transformation processing according to the capacitor voltage difference;

the step S340, performing a phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero.

Specifically, the filter voltage is the voltage difference between the positive and negative terminals of the first filter capacitor and the second filter capacitor connected in series, which is represented by $U_{dc}$. The preset voltage reference value is the voltage reference value of the positive and negative terminals of the first filter capacitor and the second filter capacitor which are connected in series, which is represented by $U_{dc\_ref}$. The difference between the filtered voltage and the preset voltage reference value is calculated to obtain the reference voltage difference. The obtained reference voltage difference is input to the PI controller to obtain the active component parameters. The active component parameters are configured to characterize the d-axis active component required for the phase coordinate transformation processing. Then dq/abc coordinate transformation is performed according to the active component parameters and the preset reactive component parameters to obtain the capacitor voltage control component, wherein, the reactive component parameters are configured to characterize the q-axis reactive component required for the phase coordinate transformation processing, in which the reactive component parameter is set to 0. The dq/abc transformation can be applied to obtaining the capacitor voltage control components $I_a^*$, $I_b^*$, $I_c^*$.

Specifically, Park's Transformation is used to perform dq/abc transformation processing.

In one embodiment, a system for unbalanced current in split-phase adjustment of a distribution transformer according to an embodiment of the present invention is further provided with a hysteresis controller for sending switching signals to the three-phase full-bridge inverter. The three-phase full-bridge inverter tracks the compensation current reference value according to the switching signal.

In one embodiment, a system for unbalanced current in split-phase adjustment of a distribution transformer according to an embodiment of the present invention is further provided with a linear controller.

Specifically, the linear controller is achieved by using a Proportional Integral controller (PI controller), wherein the capacitor voltage difference is adjusted through the PI controller to obtain the D-axis active component required for the phase coordinate transformation processing.

Specifically, the system for the unbalanced current adjustment from the capacity enhancement and the split-phase output of the distribution transformer further includes a PI controller, wherein the obtaining the D-axis active component required for the phase coordinate transformation processing according to the capacitor voltage difference includes inputting the capacitor voltage difference into the PI controller to obtain the D-axis active component required for the phase coordinate transformation processing.

In one embodiment, the negative sequence current and zero sequence current superimpose the capacitor voltage control components Ia*, Ib*, Ic*, so as to obtain the compensation current reference values Ia_ref, Ib_ref, Ic_ref; by making the actual compensation current output by the three-phase full-bridge inverter track the compensation current reference values Ia_ref, Ib_ref, and Ic_ref, the actual output compensation currents Ioa, Iob, and Ioc are obtained.

Specifically, the obtaining the a-phase compensation current reference value according to the a-phase negative sequence current, the a-phase zero sequence current, and the a-phase capacitor voltage control component, the obtaining the b-phase compensation current reference value according to the b-phase negative sequence current, the b-phase zero sequence current, and the b-phase capacitor voltage control component, and the obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$
$$I_{b\_ref} = I_b^- + I_b^0 + I_b^*$$
$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value; $I_a^-$ represents the a-phase negative-sequence current, $I_b^-$ represents the b-phase negative sequence current, $I_c^-$ represents the c-phase negative sequence current; $I_a^*$ represents the a-phase capacitor voltage control component, $I_b^*$ represents the b-phase capacitor voltage control component, $I_c^*$ represents the c-phase capacitor voltage control component.

In one embodiment, the system for the unbalanced current adjustment from the capacity enhancement and the split-phase output of the distribution transformer further includes a hysteresis controller.

Figure 5:
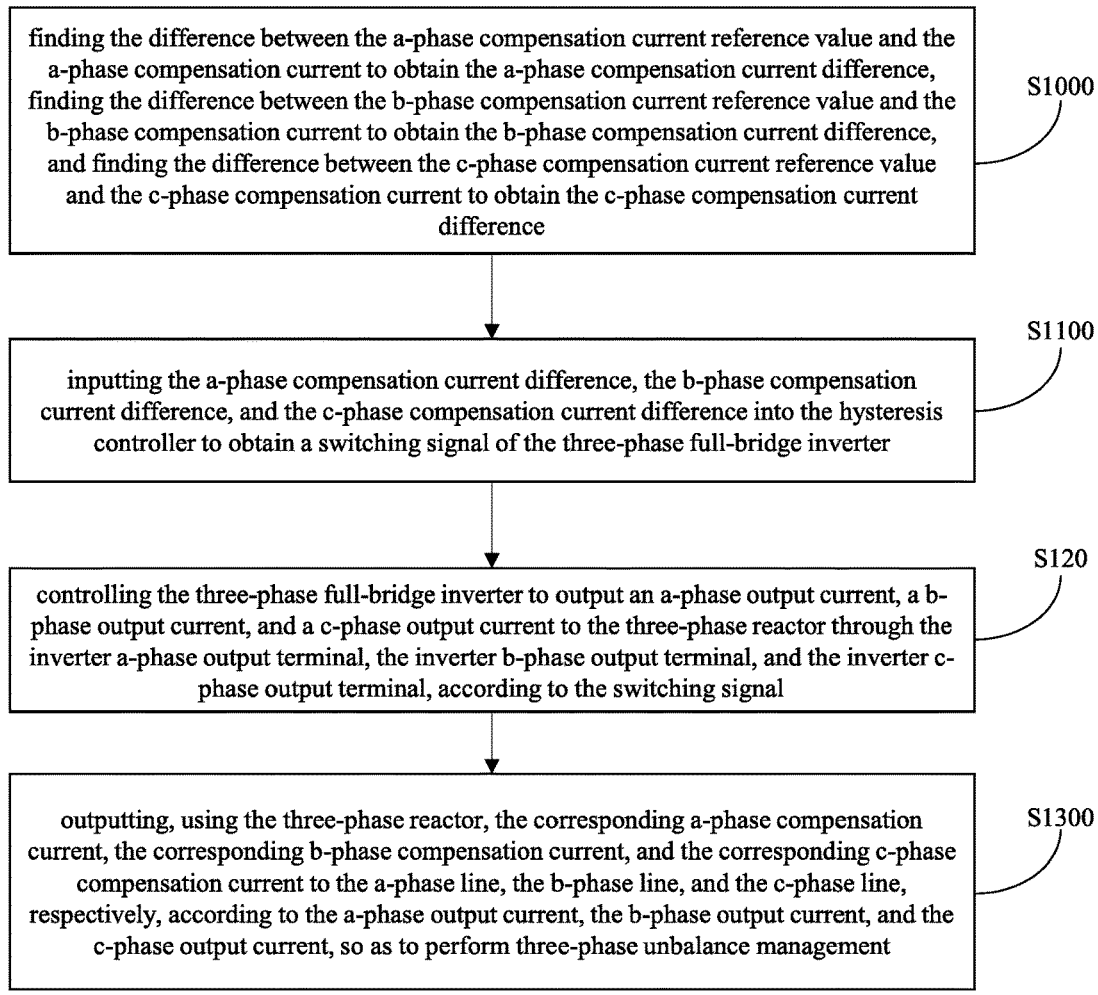
FIG. 5 is a flow chart of a method for unbalanced current adjustment from capacity increase and phase-splitting output of a distribution transformer according to another embodiment.

Referring is made to FIG. 5, the method for the unbalanced current adjustment from the capacity enhancement and the split-phase output of the distribution transformer further includes steps S1000 to S1300:

the step S1000, finding the difference between the a-phase compensation current reference value and the a-phase compensation current to obtain the a-phase compensation current difference, finding the difference between the b-phase compensation current reference value and the b-phase compensation current to obtain the b-phase compensation current difference, and finding the difference between the c-phase compensation current reference value and the c-phase compensation current to obtain the c-phase compensation current difference;

the step S1100, inputting the a-phase compensation current difference, the b-phase compensation current difference, and the c-phase compensation current difference into the hysteresis controller to obtain a switching signal of the three-phase full-bridge inverter;

the step S1200, controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

the step S1300, outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance management.

Specifically, the switching signal of the three-phase full-bridge inverter are obtained from getting differences between Ia_ref and Ioa, between Ib_ref and Iob, between Ic_ref and Ioc, and the differences are sent to the hysteresis controller, respectively, so as to make the hysteresis controller output the switching signal of the three-phase full-bridge inverter. Accordingly, the actual compensation current Ioa, Iob, Ioc are obtained and output by tracking the current reference values Ia_ref, Ib_ref, Ic_ref through the hysteresis controlling.

In some embodiments, when the three-phase load of the distribution transformer is balanced, the three-phase full-bridge inverter is controlled to output the same current to the a-phase line, the b-phase line, and the c-phase line, respectively, so as to provide electric energy for the load at the low-voltage side of the distribution transformer. Since the single-phase bridge rectifier independently acquires power from the high-voltage side of the distribution transformer through the single-phase transformer, when the three-phase load of the distribution transformer is balanced, the three-phase full-bridge inverter can also serve as a power source for power supplying for the load at the low-voltage side of the distribution transformer, maximizing equipment capacity utilization and enhancing the system's cost-effectiveness.

Figure 6:
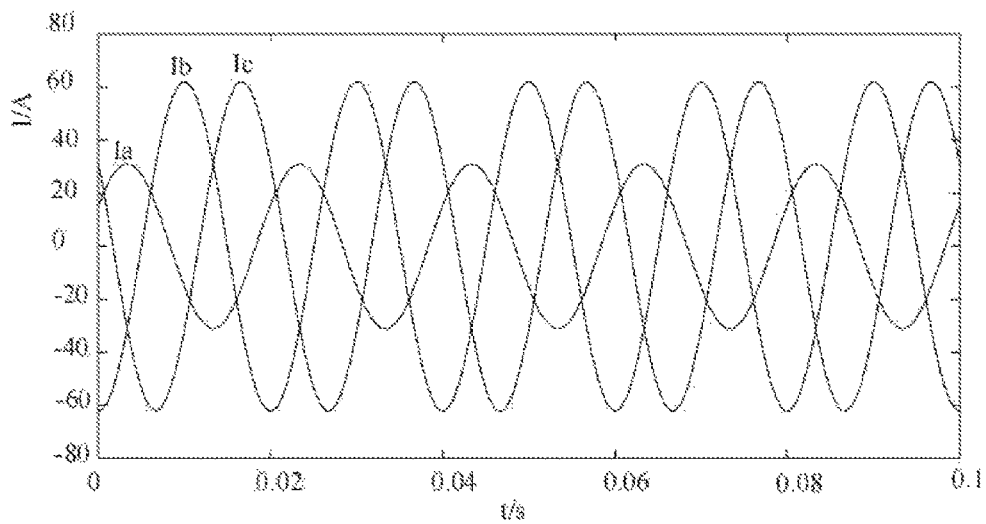
FIG. 6 is a three-phase unbalanced current waveform diagram at a load side according to an embodiment.
Figure 7:
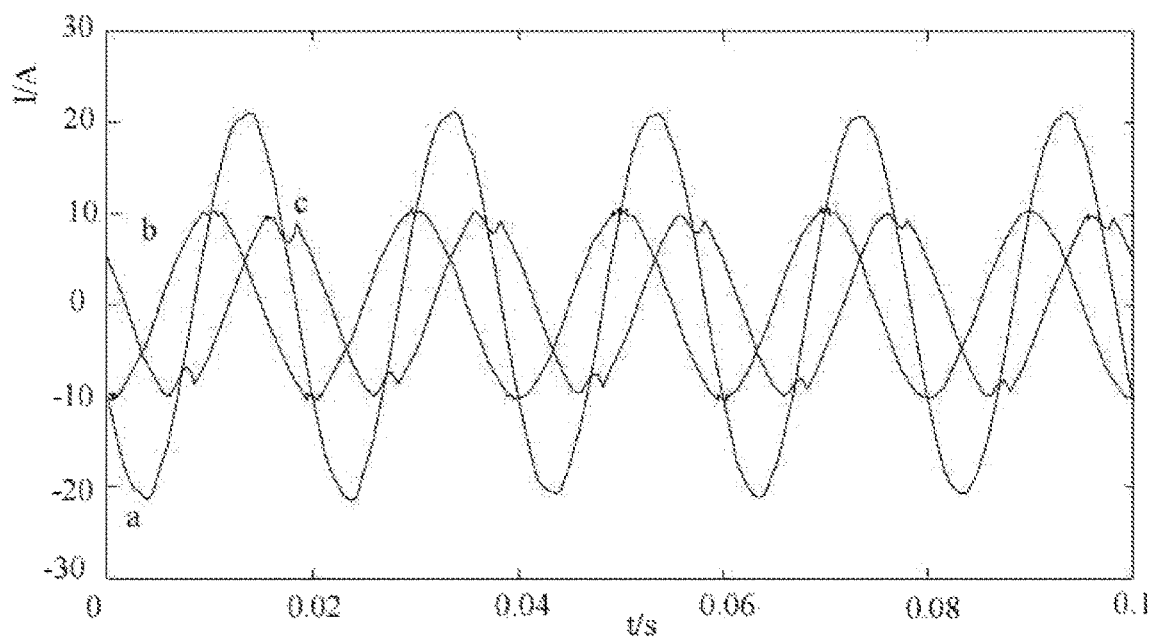
FIG. 7 is a current waveform diagram which output by a three-phase full-bridge inverter according to an embodiment.
Figure 8:
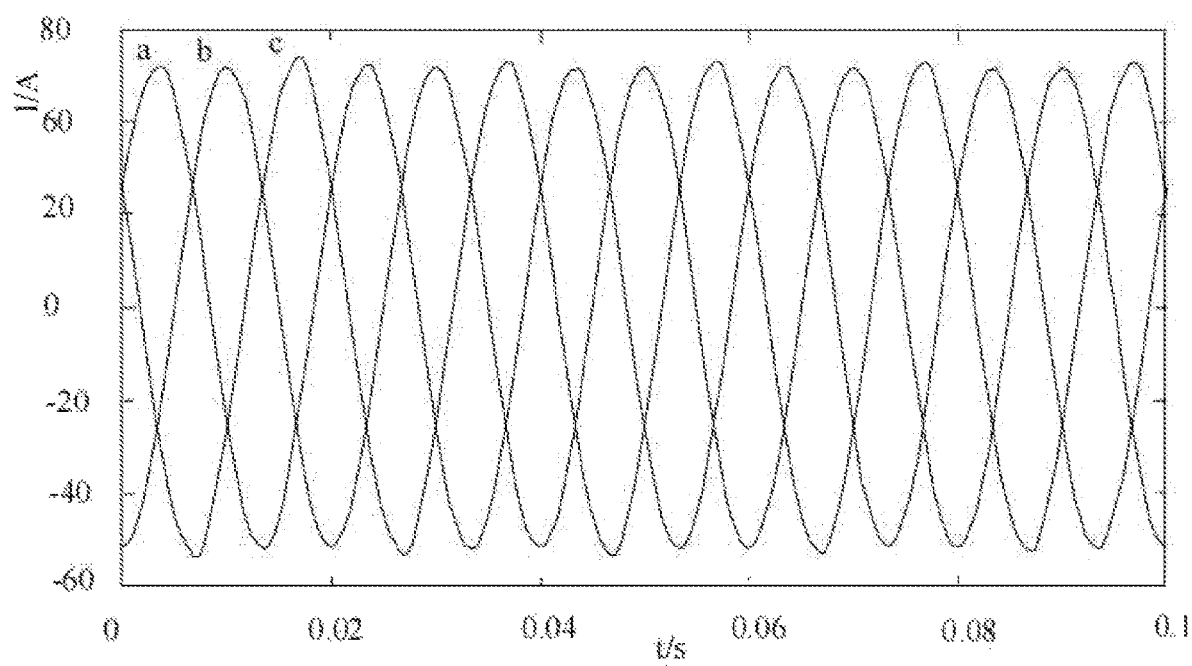
FIG. 8 is a current waveform diagram of a target current adjusted using a method for unbalanced current adjustment from capacity increase and phase-splitting output of a distribution transformer provided by the present invention, according to an embodiment.

Referring is made to FIG. 6 to FIG. 8, in which FIG. 6 is a three-phase unbalanced current waveform diagram at a load side according to an embodiment, and FIG. 7 is a current waveform diagram which output by a three-phase full-bridge inverter according to an embodiment. FIG. 8 is a current waveform diagram of a target current adjusted using a method for unbalanced current adjustment from capacity increase and phase-splitting output of a distribution transformer provided by the present invention, according to an embodiment;

It can be calculated from FIG. 6 that the current unbalance degree of the three-phase initial current is 66.6%, and it can be calculated from FIG. 8 that the current unbalance degree of the target current is 1.2%. Therefore, the method for the unbalanced current adjustment from the capacity enhancement and the split-phase output of the distribution transformer provided by the embodiment of the present invention can completely realize the three-phase balance in current and solve the problem of three-phase unbalance in three-phase current in the prior art.

Based on the system for the unbalanced current adjustment from the capacity enhancement and the split-phase output of the distribution transformer as shown in FIG. 1, embodiments of the present invention further provide a computer device, including:

at least one memory;
at least one processor;
at least one computer program;
wherein the computer program is stored in the memory, and the processor executes the at least one computer program to achieve the method for the unbalanced current adjustment from the capacity enhancement and the split-phase output of the distribution transformer of the embodiments of the present disclosure, as described above. The computer device can be any smart terminal including a mobile phone, a tablet computer, a personal digital assistant (Personal Digital Assistant, PDA), or a vehicle-mounted computer, etc.

The computer device according to embodiments of the present invention is introduced in detail below with reference to FIG. 9.

Figure 9:
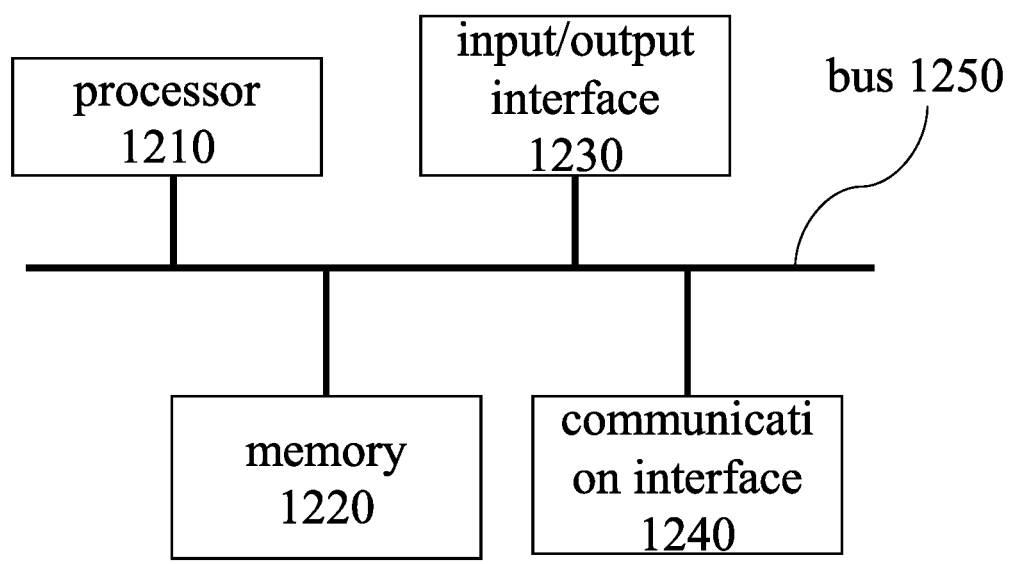
FIG. 9 is a schematic structural diagram of a computer device according to an embodiment.

As shown in FIG. 9, FIG. 9 illustrates a hardware structure of a computer device according to another embodiment. The computer device includes:

a processor 1210 which can be implemented by a general central processing unit (Central Processing Unit, CPU), a microprocessor, an application specific integrated circuit (Application Specific Integrated Circuit, ASIC), or one or more integrated circuits, wherein it is used to execute relevant programs so as to implement the technical solutions provided by embodiments of the present disclosure;

a memory 1220 which can be implemented in the form of read only memory (Read Only Memory, ROM), static storage device, dynamic storage device, or random access memory (Random Access Memory, RAM). The memory 1220 can store operating systems and other application programs. When implementing the technical solutions provided by the embodiments of this specification through software or firmware, the relevant program codes are stored in the memory 1220 and called by the processor 1210 to execute the method for the unbalanced current adjustment from the capacity increase and the phase-splitting output of the distribution transformer of embodiments of the present invention;

an input/output interface 1230 which is used to implement information input and output;

a communication interface 1240 which is used to realize communication and interaction between the present device and other devices, in which communication can be achieved through wired methods (such as USB, network cables, etc.) or wirelessly (such as mobile networks, WIFI, Bluetooth, etc.);

a bus 1250 which transmits information between various components of the device (such as processor 1210, memory 1220, input/output interface 1230, and communication interface 1240);

wherein, the processor 1210, the memory 1220, the input/output interface 1230, and the communication interface 1240 implement communication connections between each other inside the device through the bus 1250.

Embodiments of the present invention further provide a computer-readable storage medium. The computer-readable storage medium stores computer-executable instructions, and the computer-executable instructions are used to enable the computer to perform the above-mentioned method for the unbalanced current adjustment from the capacity increase and the phase-splitting output of the distribution transformer.

As a non-transitory computer-readable storage medium, memory can be used to store non-transitory software programs and non-transitory computer executable programs. In addition, the memory may include high-speed random access memory, and may also include non-transitory memory, such as at least one magnetic disk storage device, flash memory device, or other non-transitory solid-state storage devices. In some embodiments, the memory optionally includes memory located remotely from the processor, and these remote memories may be connected to the processor via a network. Examples of the above-mentioned networks include but are not limited to the Internet, intranets, local area networks, mobile communication networks and combinations thereof.

The embodiments described in this disclosure are intended to provide a clearer understanding of the technical solutions presented in this disclosure and do not constitute limitations on the technical solutions provided herein. Those skilled in the art can understand that with the evolution of technology and the emergence of new application scenarios, the technical solutions provided in this disclosure are equally applicable to similar technical problems.

It is understood by those skilled in the art that the technical solutions depicted in the figures do not constitute limitations on this disclosure. These solutions may include more or fewer steps than depicted in the figures, or certain steps may be combined, or different steps altogether.

The device embodiments described above are merely illustrative. Units indicated as separate components may or may not be physically separated, meaning they can be located in the same place or distributed across multiple network units. Depending on actual needs, a portion or all of the modules can be selected to implement the objectives of the disclosed embodiments.

Those skilled in the art can understand that all or some steps in the methods described in the preceding text, as well as the functional modules/units in the systems or devices, can be implemented as software, firmware, hardware, or a suitable combination thereof.

The terms "first," "second," "third," "fourth," etc. (if present) in the specification and the accompanying drawings are used to distinguish similar objects and need not necessarily denote a specific order or sequence. The use of these numbers should be understood as interchangeable, where applicable, so that the embodiments described herein can be implemented in an order different from that depicted or described here. Furthermore, the terms "comprising" and "having," and their variations, intend to cover non-exclusive inclusion. For example, processes, methods, systems, products, or devices including a series of steps or units need not be limited to those steps or units explicitly listed, but may include other steps or units inherently related to these processes, methods, products, or devices.

It should be understood that in this application, "at least one" refers to one or more, and "multiple" refers to two or more. "And/or," when used to describe the relationship between associated objects, represents the possibility of three relationships, namely, the existence of only A, the existence of only B, and the simultaneous existence of A and B. The character "/" generally indicates an "or" relationship between the associated objects. Expressions such as "at least one of the following" or similar expressions refer to any combination of these items, including any combination of one or more items, such as a, b, or c. For example, "at least one of a, b, or c" can represent: a, b, c, "a and b," "a and c," "b and c," or "a and b and c," where a, b, c can be singular or plural.

In several embodiments provided in the present application, it should be understood that the disclosed systems, devices, and methods can be implemented in other ways. For example, the described device embodiments are only illustrative. The division of units, such as the segmentation of units, is just a logical functional division, and actual implementation can involve alternative divisions. Multiple units or components can be combined or integrated into another system, and certain features can be ignored or left unexecuted. Additionally, the displayed or discussed couplings, direct couplings, or communication connections between elements can also be indirect couplings or communication connections through interfaces, devices, or units, and these connections can be electrical, mechanical, or of other forms.

Units described as separate components can physically be separate or not. Units displayed as individual components can be physical units or not, meaning they can be located in one place or distributed across multiple network units. Depending on the specific requirements, some or all of the units can be selected to achieve the purpose of the embodiments.

Furthermore, functional units in various embodiments of the present application can be integrated into one processing unit, or they can physically exist as separate units or integrated within one unit. These integrated units can be implemented in hardware form or as software functional units.

If the integrated units are implemented in the form of software functional units and sold or used as standalone products, they can be stored in a computer-readable storage medium. Based on this understanding, the technological aspects of this application, which essentially contribute to or fully or partially embody the solutions, can also be embodied in the form of software products. These computer software products are stored in a storage medium and include instructions to enable a computing device (which can be a personal computer, server, or network device, among others) to execute all or part of the steps of the various embodiments described in this application. The aforementioned storage media can include USB drives, external hard drives, Read-Only Memory (ROM), Random Access Memory (RAM), magnetic disks, optical disks, and various other media capable of storing program code.

The above-disclosed embodiments represent preferred embodiments of the present invention. However, these embodiments should not be seen as limiting the scope of the present invention. Therefore, any equivalent changes made in accordance with the claims of the present invention are still within the scope of the present invention.

What is claimed is:

1. A system and method for unbalanced current adjustment from capacity enhancement and split-phase output of a distribution transformer, which is applied to a power distribution system, the power distribution system comprising a distribution transformer and an a-phase line, a b-phase line, a c-phase line, and a neutral line n connected to a low voltage side of the distribution transformer, comprising:

a single-phase transformer, wherein an input end of the single-phase transformer is connected to any two phases of three-phase lines on a high-voltage side of the distribution transformer, the single-phase transformer is configured to change a high voltage of the distribution transformer into a low voltage, the single-phase transformer is further configured to increase capacity of a transformer area, the increased capacity of the transformer area is capacity of the single-phase transformer, and the capacity of the single-phase transformer is determined by a load size of the distribution transformer;

a single-phase bridge rectifier comprising a rectifier input end, a DC positive output terminal, and a DC negative output terminal, wherein the rectifier input end is connected to an output terminal of the single-phase transformer, the single-phase bridge rectifier is configured to convert alternating current at a low-voltage side of the single-phase transformer into direct current, which also inverts direct current into alternating current and transmits it to a power grid;

a three-phase full-bridge inverter comprising a positive inverter input terminal, a negative inverter input terminal, and an inverter output terminal, wherein the positive inverter input terminal is connected to the DC positive output terminal, and the negative inverter input terminal is connected to the DC negative output terminal, the inverter output terminal is connected to the a-phase line, the b-phase line, and the c-phase line respectively through a three-phase reactor, the three-phase full-bridge inverter is configured to output corresponding compensation currents respectively to the a-phase line, the b-phase line, and the c-phase line through the three-phase reactor, so as to perform three-phase unbalanced current adjustment;

a first filter capacitor connected to the positive inverter input terminal and the DC positive output terminal;

a second filter capacitor connected in series with the first filter capacitor, wherein the second filter capacitor is connected to the negative inverter input terminal and the DC negative output terminal, and the neutral line n is connected between the first filter capacitor and the second filter capacitor.

2. A method for unbalanced current adjustment from capacity enhancement and split-phase output of a distribution transformer, which is applied to the system for the unbalanced current adjustment from the capacity enhancement and the split-phase output of the distribution transformer of claim 1;

the method comprising:

obtaining an initial unbalance degree according to an a-phase load current of the a-phase line, a b-phase load current of the b-phase line, and a c-phase load current of the c-phase line;

when the initial unbalance degree is greater than a preset starting value, performing a sequence component decomposition processing on the a-phase load current, the b-phase load current, and the c-phase load current to obtain correspondingly an a-phase negative sequence load current, a b-phase negative sequence current, and a c-phase negative sequence current, as well as an a-phase zero-sequence current, a b-phase zero-sequence current, and a c-phase zero-sequence current;

performing calculating to obtain an a-phase capacitor voltage control component, a b-phase capacitor voltage control component, and a c-phase capacitor voltage according to a voltage between positive and negative terminals at the first filter capacitor and the second filter capacitor which are connected in series and a preset reference voltage;

obtaining an a-phase compensation current reference value according to the a-phase negative sequence current, the a-phase zero sequence current, and the a-phase capacitor voltage control component, obtaining a b-phase compensation current reference value according to the b-phase negative sequence current, the b-phase zero sequence current, and the b-phase capacitor voltage control component, and obtaining a c-phase compensation current reference value according to the c-phase negative sequence current, the c-phase zero sequence current, and the c-phase capacitor voltage control component;

outputting correspondingly an a-phase compensation current, a b-phase compensation current, and a c-phase compensation current to the a-phase line, the b-phase line, and the c-phase line, respectively, and, through hysteresis controlling, making the output a-phase compensation current, the output b-phase compensation current, and the output c-phase compensation current track the a-phase compensation current reference value, the b-phase compensation current reference value, and the c-phase compensation current, respectively, so as to adjust unbalanced current by phase.

3. The method for the unbalanced current adjustment from the capacity enhancement and the split-phase output of the distribution transformer according to claim 2, further comprising:

obtaining a present unbalance degree, which is determined by the present a-phase load current, the present b-phase load current, and the present c-phase load current;

obtaining a change amplitude of the unbalance degree according to the initial unbalance degree and the present unbalance degree;

when the change amplitude of the unbalance degree reaches a preset offset value, performing three-phase unbalanced current adjustment, according to the present a-phase load current, the present b-phase load current, the present c-phase load current, the present a-phase capacitor voltage control component, the present b-phase capacitor voltage control component, and the present c-phase capacitor voltage control component.

4. The method for the unbalanced current adjustment from the capacity enhancement and the split-phase output of the distribution transformer according to claim 2, wherein the performing calculating to obtain the a-phase capacitor voltage control component, the b-phase capacitor voltage control component, and the c-phase capacitor voltage according to the voltage between the positive and negative terminals at the first filter capacitor and the second filter capacitor which are connected in series and the preset reference voltage comprises:

obtaining a filtered voltage, which is configured to characterize a voltage between the positive terminal and the negative terminal at the first filter capacitor and the second filter capacitor connected in series;

calculating a difference between the filtered voltage and a preset voltage reference value to obtain a capacitor voltage difference;

obtaining a D-axis active component required for a phase coordinate transformation processing according to the capacitor voltage difference;

performing a phase coordinate transformation processing according to the D-axis active component and a preset Q-axis reactive component to obtain the a-phase capacitor voltage control component, the b-phase capacitor voltage control component, and the c-phase capacitor voltage control component, wherein, the Q axis reactive component is preset to be zero.

5. The method for the unbalanced current adjustment from the capacity enhancement and the split-phase output of the distribution transformer according to claim 4, wherein the system for the unbalanced current adjustment from the capacity enhancement and the split-phase output of the distribution transformer further comprises a PI controller, wherein the obtaining the D-axis active component required for the phase coordinate transformation processing according to the capacitor voltage difference comprises:

inputting the capacitor voltage difference into the PI controller to obtain the D-axis active component required for the phase coordinate transformation processing.

6. The method for the unbalanced current adjustment from the capacity enhancement and the split-phase output of the distribution transformer according to claim 2, wherein the obtaining the a-phase compensation current reference value according to the a-phase negative sequence current, the a-phase zero sequence current, and the a-phase capacitor voltage control component, the obtaining the b-phase compensation current reference value according to the b-phase negative sequence current, the b-phase zero sequence current, and the b-phase capacitor voltage control component, and the obtaining the c-phase compensation current reference value according to the c-phase negative sequence current, the c-phase zero sequence current, and the c-phase capacitor voltage control component are performed by formulas as follows:

$$I_{a\_ref} = I_a^- + I_a^0 + I_a^*$$

$$I_{b\_ref} = I_b^- + I_b^0 + I_b^*$$

$$I_{c\_ref} = I_c^- + I_c^0 + I_c^*$$

wherein, $I_{a\_ref}$ represents the a-phase compensation current reference value, $I_{b\_ref}$ represents the b-phase compensation current reference value, $I_{c\_ref}$ represents the c-phase compensation current reference value; $I_a^-$ represents the a-phase negative-sequence current, $I_b^-$ represents the b-phase negative sequence current, $I_c^-$ represents the c-phase negative sequence current; $I_a^*$ represents the a-phase capacitor voltage control component, $I_b^*$ represents the b-phase capacitor voltage control component, $I_c^*$ represents the c-phase capacitor voltage control component.

7. The method for the unbalanced current adjustment from the capacity enhancement and the split-phase output of the distribution transformer according to claim 2, wherein the system for the unbalanced current adjustment from the capacity enhancement and the split-phase output of the distribution transformer further comprises a hysteresis controller, and the inverter output terminals comprise an inverter a-phase output terminal, an inverter b-phase output terminal, and an inverter c-phase output terminal;

wherein the method further comprises:

finding a difference between the a-phase compensation current reference value and the a-phase compensation current to obtain the a-phase compensation current difference, finding a difference between the b-phase compensation current reference value and the b-phase compensation current to obtain the b-phase compensation current difference, and finding a difference between the c-phase compensation current reference value and the c-phase compensation current to obtain the c-phase compensation current difference;

inputting the a-phase compensation current difference, the b-phase compensation current difference, and the c-phase compensation current difference into the hysteresis controller to obtain a switching signal of the three-phase full-bridge inverter;

controlling the three-phase full-bridge inverter to output an a-phase output current, a b-phase output current, and a c-phase output current to the three-phase reactor through the inverter a-phase output terminal, the inverter b-phase output terminal, and the inverter c-phase output terminal, according to the switching signal;

outputting, using the three-phase reactor, the corresponding a-phase compensation current, the corresponding b-phase compensation current, and the corresponding c-phase compensation current to the a-phase line, the b-phase line, and the c-phase line, respectively, according to the a-phase output current, the b-phase output current, and the c-phase output current, so as to perform three-phase unbalance management.

8. The method for the unbalanced current adjustment from the capacity enhancement and the split-phase output of the distribution transformer according to claim 2, further comprising:

when a three-phase load of the distribution transformer is balanced, controlling the three-phase full-bridge inverter to output the same current to the a-phase line, the b-phase line, and the c-phase line, respectively, so as to provide electric energy for a load at the low-voltage side of the distribution transformer.

9. A computer device, comprising:

at least one memory;

at least one processor;

at least one computer program;

wherein the computer program is stored in the memory, and the processor executes the at least one computer program to achieve:

the method of claim 2.

10. A computer-readable storage medium that stores computer-executable instructions, and the computer-executable instructions configured to make the computer execute:

the method of claim 2.

* * * * *